United States Patent
Siddiqui et al.

(10) Patent No.: US 10,785,496 B2
(45) Date of Patent: Sep. 22, 2020

(54) VIDEO ENCODING AND DECODING APPARATUS, SYSTEM AND METHOD

(71) Applicant: Sony Corporation, Tokyo (JP)

(72) Inventors: Muhammad Siddiqui, Boeblingen (DE); Yalcin Incesu, Stuttgart (DE); Oliver Erdler, Ostfildern (DE)

(73) Assignee: SONY CORPORATION, Tokyo (JP)

( * ) Notice: Subject to any disclaimer, the term of this patent is extended or adjusted under 35 U.S.C. 154(b) by 624 days.

(21) Appl. No.: 15/374,125

(22) Filed: Dec. 9, 2016

(65) Prior Publication Data

US 2017/0188039 A1    Jun. 29, 2017

(30) Foreign Application Priority Data

Dec. 23, 2015 (EP) .................................... 15202445

(51) Int. Cl.
*H04N 19/51* (2014.01)
*H04N 19/625* (2014.01)
*H04N 19/63* (2014.01)

(52) U.S. Cl.
CPC ........... *H04N 19/51* (2014.11); *H04N 19/625* (2014.11); *H04N 19/63* (2014.11)

(58) Field of Classification Search
CPC ....... H04N 19/51; H04N 19/625; H04N 19/63
USPC .................................................... 375/240.16
See application file for complete search history.

(56) References Cited

U.S. PATENT DOCUMENTS

| | | | | |
|---|---|---|---|---|
| 5,410,500 A * | 4/1995 | Ohki | ..................... | G06F 17/147 708/401 |
| 8,127,209 B1 * | 2/2012 | Zhang | ................ | H03M 13/1128 714/780 |
| 8,675,942 B2 | 3/2014 | Chang et al. | | |
| 2010/0290529 A1 * | 11/2010 | Topiwala | .............. | G06T 3/4069 375/240.16 |
| 2010/0306290 A1 * | 12/2010 | Zhang | .................. | G06K 9/6232 708/205 |
| 2011/0188569 A1 * | 8/2011 | Gonen | ................... | H04N 19/50 375/240.12 |
| 2012/0294543 A1 * | 11/2012 | Sen | ........................ | H04N 19/63 382/233 |
| 2013/0089151 A1 | 4/2013 | Do et al. | | |

(Continued)

FOREIGN PATENT DOCUMENTS

| | | |
|---|---|---|
| CN | 102917227 | 2/2013 |
| CN | 103347189 | 10/2013 |
| CN | 103618907 | 3/2014 |

OTHER PUBLICATIONS

Lu Gan et al. "Fast Compressive Imaging Using Scrambled Block Hadamard Ensemble", School of Engineering and Design, Department of Electrical and Computer Engineering, 5 pages.

(Continued)

*Primary Examiner* — William C Vaughn, Jr.
*Assistant Examiner* — Jae N Noh
(74) *Attorney, Agent, or Firm* — Xsensus LLP

(57) ABSTRACT

A video coding apparatus for encoding a compressive sensing signal has a processor. The processor
  obtains a compressive sensing sampling matrix; and
  captures the compressive sensing signal representing image data based on the compressive sensing sampling matrix, wherein the compressive sensing sampling matrix is non-uniform varied.

11 Claims, 7 Drawing Sheets

(56) References Cited

U.S. PATENT DOCUMENTS

2013/0194492 A1* 8/2013 Kutcka .................. G03B 21/11
                                                   348/441
2016/0299975 A1* 10/2016 Acar ...................... G06N 5/022

OTHER PUBLICATIONS

Video compression picture types, http://en.wikipedia.org/wiki/Video_compression-picture-types, 2016, 4 pages.
M. Salman Asif et al "Low-Complexity Video Compression and Compressive Sensing", Dallas technology Laboratory, 4 pages.
Ivan W. Selesnick et al. "The Dual-Tree Complex Wavelet Transform", IEEE Signal Processing Magazine, 2005, 29 pages.
Stephen Becker et al. "Nesta: A fast and Accurate First-Order Method for Sparse Recovery", 37 pages.
Rebecca M. Willett et al. "Compressed sensing for practical optical imaging systems: a tutorial", Optical Engineering, 2011, 14 pages.
Roummel F. Marcia et al. "Compressive Optical Imaging: Architecture and Algorithms", WILEYVCH, 2010, 21 pages.
Muhhamad Yousuf Baig et al "Compressed Sensing-Based Distributed Image Compression", Applied sciences, 2014, 20 pages.
Robert Likamwa et al "Energy Characterization and Optimization of Image Sensing Toward Continuous Mobile Vision", MobiSys 13, 2013, 13 pages.
Sungkwang Mun et al. Residual Reconstruction for Block-Based Compressed Sensing of Video, Geosystems Research Institute, 10 pages.
Emmanuel Candes et al. "Near Optimal Signal Recovery from Random Projections: Universal Encoding Strategies?", University of California, Caltech, 2006, 39 pages.
"Randperm", http://de.mathworks.com/help/mattlab/ref/randperm.html?requestedDomain+www.mat . . . , 2016, 2 pages.
Julian Magarey et al "Motion Estimation Using a Complex-Valued Wavelet transform", Cooperative Research Centre for Sensor Signal and Information Processing, Signal Processing and Communications Laboratory of Cambridge University, 26 pages.
Ce Liu "Beyond Pixels: Exploring New Representations and Applications for Motion Analysis", Massachusetts Institutes of Technology, 2009, 164 pages.
Emmanuel J. Candes"Compressive sampling", Proceedings of the International Congress of Mathematicians, 2006, 20 pages.
Andrew B. Watson et al "Image Compression Using the Discrete Cosine Transform", Mathematica Journal 4, 1994, 17 pages.
Sungkwang Mun et al. "Block Compressed Sensing of Images Using Directional transforms", Mississippi State University, 4 pages.
"Peak Signal-to Noise ratio", https://en.wikipedia.org/wiki/peak_signal-to-noise_ratio, 2016, 2 pages.
Zhou Wang et al "The SSIm Index for Image Quality Assessment", hhtps://ece.uwaterloo.ca/'z70wang/research/ssim, 2016, 5 pages.

\* cited by examiner

```
1   0   0   0  -1   0   0   0   1   0   0   0  -1   0   0   0
0  -1   0   0   0   1   0   0   0  -1   0   0   0   1   0   0
0   0   1   0   0   0  -1   0   0   0   1   0   0   0  -1   0
0   0   0  -1   0   0   0   1   0   0   0  -1   0   0   0   1

0   0   0   1   0   0   0  -1   0   0   0   1   0   0   0  -1
1   0   0   0  -1   0   0   0   1   0   0   0  -1   0   0   0
0  -1   0   0   0   1   0   0   0  -1   0   0   0   1   0   0
0   0   1   0   0   0  -1   0   0   0   1   0   0   0  -1   0
``` a)                                     d)

b)                                     e)

c)                                     f)

VIDEO ENCODING AND DECODING APPARATUS, SYSTEM AND METHOD

TECHNICAL FIELD

The present disclosure generally pertains to video encoding and decoding apparatus, system and method.

TECHNICAL BACKGROUND

Generally, camera system architectures are known, which are used, for example, as wearable cameras. Known cameras typically have a CMOS (Complementary Metal Oxide Semiconductor) image sensor, CCD (Charge Coupled Device) image sensor, or the like, which might have a high energy consumption.

Moreover, in digital imaging it is known to directly measure, for example, the intensity of a scene with a pixel array sensor which is based on the CMOS, CCD or similar technology mentioned above. In contrast to direct measuring, where every pixel of the sensor is read out, other methods are known, such as compressive sensing, which can also reduce energy consumption of image sensors.

Although there exist techniques for video encoding and decoding it is generally desirable to improve the encoding and decoding of video data.

SUMMARY

According to a first aspect the disclosure provides a video coding apparatus for encoding a compressive sensing signal comprising a processor, the processor being configured to obtain a compressive sensing sampling matrix; and capture the compressive sensing signal representing image data based on the compressive sensing sampling matrix, wherein the compressive sensing sampling matrix is temporal and non-uniform varied.

According to a second aspect the disclosure provides a video decoding apparatus for decoding compressive sensing video data comprising a processor, the processor being configured to decode compressive sensing video data on the basis of a sparsifying transform being based on a discrete cosine transform and a discrete wavelet transform.

According to a third aspect the disclosure provides a video system comprising a video coding apparatus in accordance with the first aspect and a video decoding apparatus in accordance with the second aspect.

According to a fourth aspect the disclosure provides a method of encoding a compressive sensing signal comprising obtaining a compressive sensing sampling matrix; and capturing the compressive sensing signal representing image data based on the compressive sensing sampling matrix, wherein the compressive sensing sampling matrix is temporal and non-uniform varied.

According to a fifth aspect the disclosure provides a video decoding method for decoding compressive sensing video data comprising decoding compressive sensing video data on the basis of a sparsifying transform being based on a discrete cosine transform and a discrete wavelet transform.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
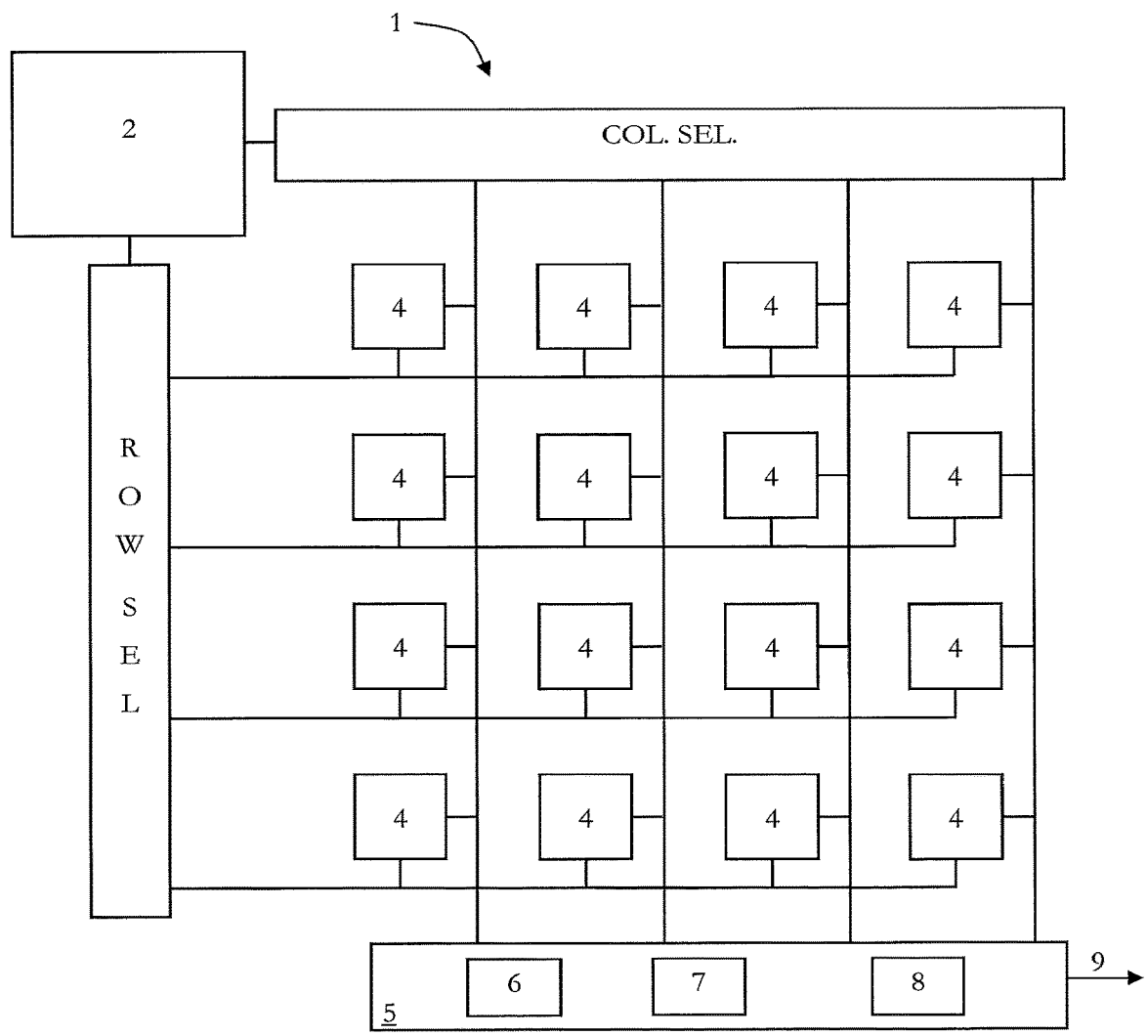
FIG. 1 schematically illustrates an image sensor.

Before a detailed description of the embodiments under reference of FIG. 1, general explanations are made.

As mentioned in the outset, camera system architectures are known, which are used, for example, as wearable cameras, smartphones, or the like. Known cameras typically have a CMOS (Complementary Metal Oxide Semiconductor) image sensor, CCD (Charge Coupled Device) image sensor, or the like, which might have a high energy consumption.

In order to reduce energy consumption of such image sensors, compressive imaging which is based on the principle of compressive sensing is used in some embodiments. Compressive sensing (referred to as "CS" hereinafter in some instances) is based on the principle that a signal that is sparse in any domain (time domain, spatial domain, etc.) can be accurately recovered from much fewer samples as compared to the original number of samples in the sparse domain. A signal is sparse if it contains a small number of nonzero components relative to the total signal length. In other words, the signal is mostly zero. The principles of compressive sensing and of sparsity are well known in the art.

In some embodiments, compressive sensing allows to capture or encode fewer samples of image data taken by sensing devices. The encoded image data can then later be recovered with respective sparse reconstruction algorithms, as will be explained in more detail further below.

In some embodiments, the compressive sensing based sensor architecture will result in significant reduction of energy consumption, since, for example, it is not necessary to read out every sensor pixel of an image sensor.

In general it is known that analog-to-digital-converters might have a high energy consumption and might be a performance bottleneck of high-speed, high-resolution CMOS image sensors, as is exemplary shown in section 7 of Robert LiKamWa, et al., "Energy Characterization and Optimization of Image Sensing Toward Continuous Mobile Vision", available from: "http://www.ruf.rice.edu/~mobile/publications/likamwa2013mobisys1.pdf".

In some embodiment, for example, for reducing the energy consumption of an image sensor by a factor "R", the sensor can be down-sampled by a factor R. However, in some embodiments, in order to achieve the same amount of energy saving when using compressing sensing, a compression ratio of M times R (M×R) might be applied. In this case, M is larger than 1 and M is the multiplication factor and its value can be determined, for example, on the basis of the further compression capability of compressive sensed data.

Furthermore, for the image quality estimation evaluation criteria may include subjective evaluation criterial as well as objective measurement metrics like peak signal-to-noise ratio (PSNR), structural similarity (SSIM), or the like.

Of course, the present disclosure is not limited in that regard and the values given above, and, in general, the values given in this disclosure are only mentioned for illustration purposes.

In some embodiments, a video coding apparatus for encoding a compressive sensing signal includes a processor. The processor is configured to obtain a compressive sensing sampling matrix, for example by generating it or read a pre-generated sampling matrix, e.g. from a memory, storage, over the network, or the like, and to capture the compressive sensing signal representing image data based on the compressive sensing sampling matrix, wherein the compressive sensing sampling matrix is temporal and non-uniform varied.

The compressive sensing signal origins from an image sensor, such as a CMOS sensor, CCD sensor or the like. The compressive sensing signal represents image data, for example, of single images or multiple images (video data). The compressive sensing signal may be analogue or a digital signal and it may be converted accordingly for the application of a respective encoding. The compressive sensing signal is captured on the basis of the compressive sensing sampling matrix. For example, the compressive sensing sampling matrix may be used to control which of the pixels of the image sensor are read out, thereby the compressive sensing signal is generated by reading out the image sensor on the basis of the compressive sensing sampling matrix.

The compressive sensing sampling matrix can be generated with the known Scrambled Block Hadamard Ensemble (SBHE) algorithm, a Gaussian algorithm or the like, as known in the art. The compressive sensing sampling matrix is use to capture the compressive sensing signal. For instance, the SBHE algorithm is known from L. Gan et al., "Fast compressive imaging using scrambled block Hadamard ensemble", Proceedings of 16th IEEE European Signal Processing Conference, 2008.

The compressive sensing sampling matrix is temporal and/or non-uniform varied. For example, when the compressive sensing signal shall represent a series of images, the compressive sensing sampling matrix can be varied in a non-uniform manner each time before it is applied to capture the compressive sensing signal including the next image in the compressive sensing signal. Of course, the present disclosure is not limited to that example, but in principle, any kind of temporal variation of the compressive sensing sampling matrix shall be covered, e. g. a variation for every second, third, fourth, . . . , etc. image.

By varying the compressive sensing sampling matrix in a temporal and/or non-uniform manner, in some embodiments, the image quality can be increased and, e.g. artifact effects due to the image compression may be reduced or even avoided. In other words, the more random the image sensor is read out the less artifacts may be produced.

In some embodiments, the compressive sensing sampling matrix is temporal varied by applying a cyclic shift. A cyclic shift is known in mathematics, and it can be done about an arbitrary number of positions, and in any arbitrary direction. For instance, the cyclic shift may be based on a vertical shift and/or a horizontal shift. In order to increase randomness of the compressing sensing sampling matrix and the cyclic shift itself, the number of positions of the cyclic shift may be calculated on the basis of a random integer number.

In some embodiments, the compressive sensing sampling matrix is used on a frame-by-frame basis for capturing the compressive sensing signal. Thereby, the compressive sensing signal represents image (video) frames and for each frame the compressive sensing sampling matrix is used for capturing the compressive sensing signal. The concept of frames is well known in video encoding.

In some embodiments, for capturing of each frame a new compressive sensing sampling matrix is obtained (generated, read from memory, etc., as mentioned above), wherein the compressive sensing sampling matrix is random. The randomness can be achieved by known methods, such as using Gaussian matrices, Fourier ensembles, random binary matrices, etc., as known in the art.

In some embodiments, at least one of the frames is a key frame being generated with a lower compression ratio compared to at least one other frame. As the key frames are encoded with a lower compression ratio they can be reconstructed with a higher quality and, thus, can also be used to improve the image quality of the decoded non-key frames.

In some embodiments, at least two different compressive sensing sampling matrices are obtained (generated, read from memory, etc., as mentioned above)) for at least two different compression ratios for capturing the compressive sensing signal. Thereby, for example, the above-mentioned key-frames and non-key-frames may be generated and the image quality of decoded non-key-frames can be improved, as discussed.

In some embodiments, the compressive sensing sampling matrix fulfils at least one of the following conditions: a mean value of the absolute sum along each column of the sampling matrix is equal to one, and a variance of the absolute sum along each column of the sampling matrix is equal to zero.

In some embodiments, such a compressive sensing sampling matrix can have low cost, i.e. it might consist of only one non-zero entry per column.

The sampling matrix may consist of 0, +1 and −1 values. In some embodiments, multipliers in the image sensor for reading out the pixels of the image sensor can be avoided compared to embodiments where, for example, the compressive sensing sampling matrix includes floating point numbers.

Some embodiments pertain to a video decoding apparatus for decoding compressive sensing video data, in particular compressive sensing video data which has been generated by a video coding apparatus described herein, including a processor. The processor is configured to decode compressive sensing video data on the basis of a sparsifying transform being based on a discrete cosine transform and a discrete wavelet transform. The discrete cosine transform and the discrete wavelet transform are generally known to the skilled person. By applying both the discrete cosine transform and the discrete wavelet transform, drawbacks of each transform may be balanced out, since typically the drawbacks of the discrete cosine transform are not present for the discrete wavelet transform and vice versa. Thereby, the image quality of decoded compressive sensing video data may be improved in some embodiments. In some embodiments the sparsifying transform is based on a product of the discrete cosine transform and the discrete wavelet transform.

In some embodiments, the compressive sensing video data includes video frames and the processor is further configured to identify video frame groups. By identifying video frame groups, e.g. a group including one key-frame and one or more non-key-frames, the image quality of decoded video data can be improved.

In some embodiments, the processor is further configured to perform motion detection on the compressive sensing video data, and/or the processor is further configured to perform motion estimation on the compressive sensing video data.

Some embodiments pertain to a video system including a video coding apparatus as described herein and a video decoding apparatus for decoding compressive sensing video data as described herein.

Some embodiments pertain to a method of encoding a compressive sensing signal. The method includes obtaining (e.g. generating, reading from memory, etc., as mentioned above) a compressive sensing sampling matrix and capturing the compressive sensing signal representing image data based on the compressive sensing sampling matrix, wherein the compressive sensing sampling matrix is non-uniform varied, as described above. All features discussed above in connection with the video coding apparatus can also be included by the method of encoding a compressive sensing signal.

As discussed above, the compressive sensing sampling matrix may be temporal varied by applying a cyclic shift. The cyclic shift may be based on at least one of: vertical shift and horizontal shift. The generation of the compressive sensing sampling matrix may be based on at least one of Hadamard transform and Gaussian distribution. The compressive sensing sampling matrix may be used for capturing on a frame-by-frame basis. For each frame a new compressive sensing sampling matrix may be obtained, wherein the compressive sensing sampling matrix is random. At least one of the frames is a key frame being generated with a lower compression ratio compared to at least one other frame. At least two different compressive sensing sampling matrices may be obtained for at least two different compression ratios used for capturing the compressive sensing signal. The compressive sensing sampling matrix may fulfil at least one of the following conditions: a mean value of the absolute sum along each column of the sampling matrix is equal to one, and a variance of the absolute sum along each column of the sampling matrix is equal to zero. The sampling matrix may consist of 0, +1 and −1 values.

Some embodiments pertain to a video decoding method for decoding compressive sensing video data including decoding compressive sensing video data on the basis of a sparsifying transform being based on a discrete cosine transform and a discrete wavelet transform. The method may include the features of the video decoding apparatus as described herein. The sparsifying transform may be based on a product of the discrete cosine transform and the discrete wavelet transform. The compressive sensing video data may include video frames and the method may further include identifying video frame groups. The method may further include performing motion detection on the compressive sensing video data. The method may further include performing motion estimation on the compressive sensing video data.

Returning to FIG. 1, an exemplary image sensor 1 is schematically illustrated. The image sensor 1 has a controller 2, and several pixels 4 which are arranged in a pixel array in a sensor plane. Each pixel 4 is coupled to the controller 2 via a column selection (col. sel.) and a row selection (row sel.), via which each pixel is individually selectable by the controller 2. The output from the pixels 4 is fed into a read out circuit 5 having exemplary a sign inverter 6, an analog adder 7 and an ADC 8 (Analog to Digital Converter). The output from the pixels 4 are fed to the sign inverter, then into the analog adder 7 and from the analog adder 7 the image data read out from the pixels 4 are fed into the ADC 8 from which image data 9 are output by the image sensor 1.

In order to realize compressive sensing encoding on an image sensor, in the present embodiment, without limiting the present disclosure in that regard, certain low cost matrix requirements are met.

Figure 9:
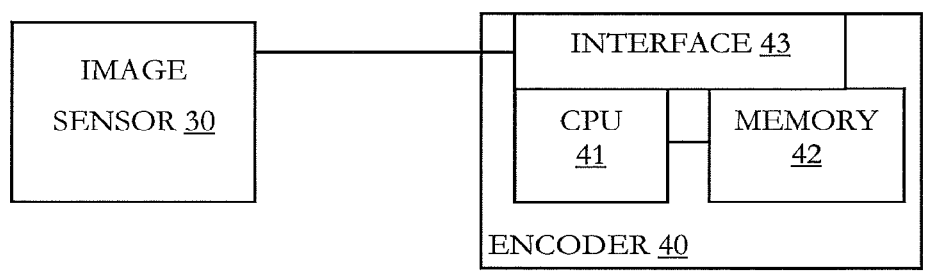
FIG. 9 schematically illustrates an encoder.

One low cost matrix requirement is the maximum block size that can be used by a compressive sensing encoder, such as compressive sensing video encoder 40 illustrated in FIG. 9. This limitation is usually based on the line memories (pixels 4) that can be read and stored internally at once. For the current image sensor architecture 1 illustrated in FIG. 1, a maximum size of compressive sensing sampling matrix is restricted to L×L, since there are only L lines of pixels which can be read out at once.

In some embodiment, the randomness of the sampling process is directly dependent on the size of the compressive sensing sampling matrix, which will be described in more detail below. Therefore, this block size restriction may result in a significant drop of performance compared to state-of-the-art implementations. In experiments it has been observed that this restriction alone might cause an average drop of about 2 to 3 dB of the PSNR (peak signal-to-noise ratio) performance.

Another low cost matrix requirement in this embodiment, without limiting the present disclosure in that regard, is that the sampling matrix should only consist of 0 and ±1 values. This limitation in this embodiment is based on the fact that utilizing floating point values would require multipliers in the image sensor 1 that are usually expensive in terms of cost as compared to adders 7 and inverters 6.

In general, as also mentioned above, Gaussian matrixes consisting of floating point values are also suited for maximizing randomness in the sampling process described herein. However, it is known that SBHE matrices consisting, for example, only of 0 and ±1 values have similar performance as that of Gaussian matrices.

Additionally, for the generation of low cost sampling matrix, in this embodiment, a further restriction is that the maximum number of non-zeros per column should be one.

This low cost restriction might result in a small reduction in randomness and consequently might result in a negligible deterioration of performance in some embodiments.

Hence, for the following description it is assumed that an image sensor 1 is used as described above resulting in the described low cost limitations. Of course, other image sensors can be used which will not have such low cost limitations.

Figure 11:
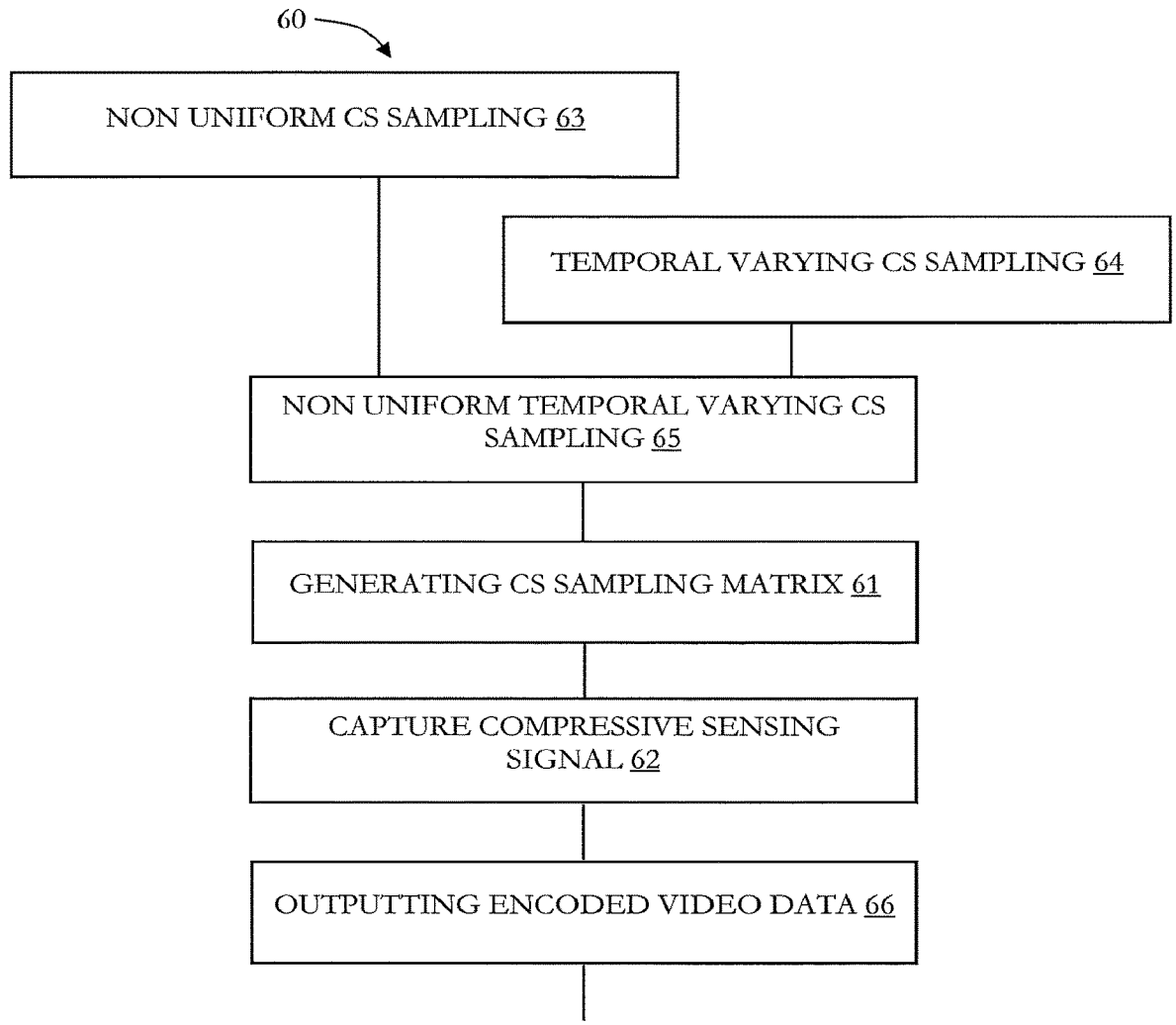
FIG. 11 is a flowchart of an encoding method.

For the following description of an encoder and a respective encoding method, reference will be made to the encoder 40 illustrated in FIG. 9 and exemplary the encoding method 60 of FIG. 11.

The encoder 40 of FIG. 9 has a CPU 41 (Central Processing Unit), a memory 42 and an interface 43. It is coupled to an image sensor 30, which can be, for example, image sensor 1 as shown in FIG. 1 and as described above. Although a hardwired coupling between the encoder 40 and the image sensor 30 is shown in FIG. 9, any kind of data connection can be used, such as network, wireless connection or the like. Moreover, the encoder can be realized in any kind of apparatus and device, such as personal computer, smartphone, smart glass, digital camera, etc. The image sensor 30 and the encoder 40 can be located together within a device, e.g. a smart glass, digital camera, smartphone, etc. or the can be separated from each other. The CPU 41 is configured to execute the method of FIG. 11 in this embodiment. In some embodiments, the video encoder 40 controls the image sensor 30 by sending respective control commands such that the compressive sensing sampling matrix can be used for capturing the compressive sensing signal at 62.

In the following, a complete video encoding method 60 is described. Of course, the present disclosure is not limited to the specific method 60.

1. Video Encoding 1.1 PMM (pixel multiplexing method) Compressive Sensing Sampling Matrices As mentioned, compressive sensing sampling matrices are used for read out the image sensor 30 (or image sensor 1) in order to receive image data from it, i. e. for capturing the compressive sensing signal at 62 (FIG. 11).

In order to generate PMM compressive sensing sampling matrices at 61 (FIG. 11), a SBHE (or Scrambled Block Hadamard Ensemble, as mentioned above) algorithm is used that is based on the known Hadamard transform. In this embodiment, compressive sensing sampling matrices generated by SBHE algorithm consist only of 0 and ±1 values. The compressive sensing sampling matrices may have almost the same recovery performance as, for example, Gaussian matrices and they satisfy the matrix conditions of compressive sensing sampling. Moreover, the compressive sensing sampling matrices can be easily generated for L×L block size (e.g. 4×4 for sensor 1 of FIG. 1) and also for different compression ratios (or CR).

However, these matrices, which are purely based on the SBHE algorithm, do not meet the above single non-zero entry per column requirement. In order to meet this requirement in the present embodiment, an additional constraint is introduced into the SBHE algorithm. The single non-zero entry per column requirement can be met by checking the absolute sum along each column of the sampling matrix and also by estimating the mean and variance of these absolute sums of all columns.

If the mean value is equal to one and the variance is equal to zero, each compressive sensing sampling matrix is generated having or consisting of single non-zero entry per column. Mathematically, these conditions can be written as follows:

$$\text{Mean} = \left(\sum_{i=1}^{M} |\Phi(i, j)|\right) == 1$$

$$\text{Variance}\left(\sum_{i=1}^{M} |\Phi(i, j)|\right) == 0$$

Where $\Phi$ is the compressive sensing sampling matrix of size M×N generated by the SBHE algorithm. For instance, if the block size is L×L then N=L×L i.e. $L^2$, and for a compression ratio of CR, M=N/CR i.e. $L^2$/CR.

An example of a sampling matrix of size 4×16 for a CR of 4 and 4×4 block size is shown below:

As can be taken form this example of a compressive sensing sampling matrix, most of the values are zero and, thus, the pixels (4 of image sensor 1 in FIG. 1) for which a zero is present in the compressive sensing sampling matrix will not be read out for capturing the compressive sensing signal.

Figures 3, 4:
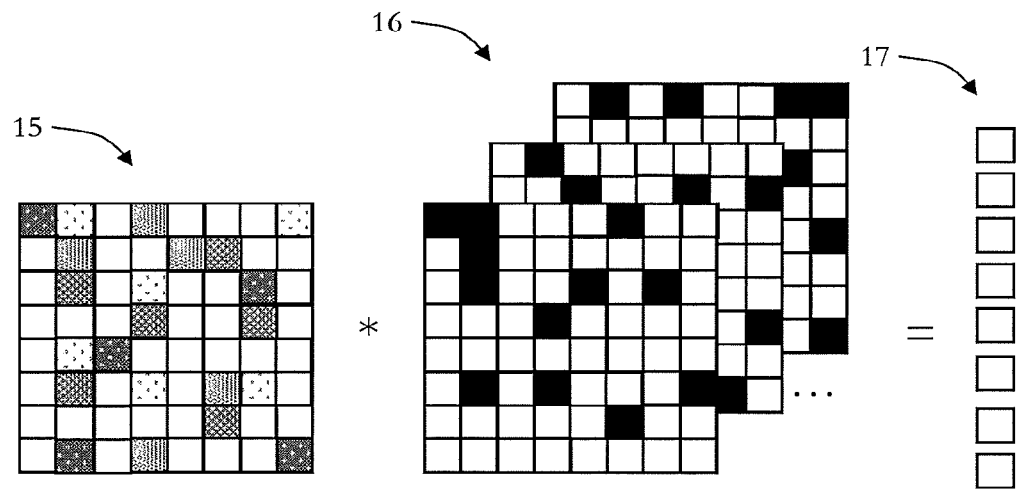
FIG. 3 illustrates the application of random sampling matrices on a video image frame.
FIG. 4 illustrates a cyclic shift of a compressive sensing sampling matrix.

FIG. 3 schematically illustrates the application of a number of M where M<N sampling matrices 16 on an image frame 15. The product between the image frame 15 and the matrices 16 is a convolution, which results in N sampled pixels 17.

1.2 Non-Uniform CS Sampling

At 63 (FIG. 11), a non-uniform compressive sensing sampling is performed which is based on the conventional video coding principle. In conventional video coding, some frames are encoded as intra (or I-) frames and others are encoded as predicted (or P-) frames or even as bi-predicted (or B) frames. I-frames are only spatially encoded and therefore can be decoded with high quality due to use of lossless or almost lossless coding schemes. However, P-frames are encoded based on motion compensated differences between adjacent frames. P-frames can later also be recovered (decoded) using residual and neighboring high-quality I-frames. Moreover, a set of I- and P-frames together constitute a group of pictures that are simultaneously decoded on the decoder side.

Figure 2:
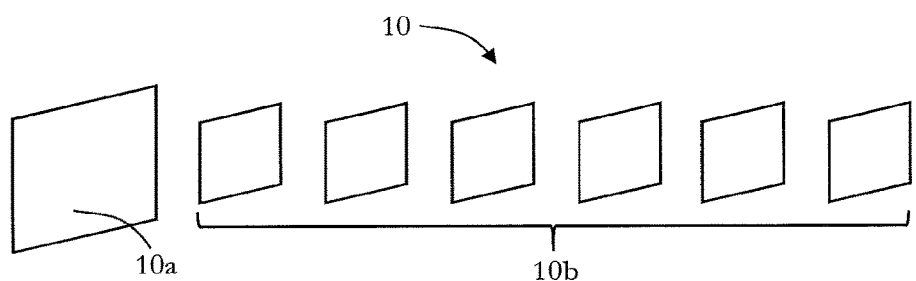
FIG. 2 illustrates a set of video image frames.

Similarly, in the context of compressive sensing, non-uniform sampling also consists of group of pictures which are included (or denote) as image or video (image) frames, such as frames 10 illustrated in FIG. 2.

Some frames are sampled with lower compression ratio (CR), illustrated as frame 10a in FIG. 2, which can therefore be recovered with a high quality. These lower CR frames 10a are similar to I-frames in conventional video coding, and, they are also known as key-frames due to the reason that these frames 10a support the recovery of other frames that are sampled with higher CR, which are illustrated as frames 10b in FIG. 2. These other frames 10b with a higher CR are usually recovered using motion compensated residual between adjacent frames or with key-frames 10a. These higher CR frames 10b are similar to P- or B-frames in conventional video coding, and they are also denoted as non-key frames 10b. The reason in the embodiment to use non-uniform sampling is that a few high quality recovered key-frames 10a may help to significantly improve the recover quality of the high compression non-key frames 10b during the reconstruction (decoding) process which is also discussed below.

1.3 Temporal Varying CS Sampling

As discussed earlier, one of the most significant concepts of compressive sensing theory is based on randomness of the sampling process. To satisfy this pre-requisite, the compressive sensing sampling matrices are designed to achieve maximum randomness in this embodiment. Examples of two dimensional (2D) random sampling matrices are Gaussian matrices, Fourier ensembles, random binary matrices, etc. For the case of the present video encoding embodiment, the

| 1 | 0 | 0 | 0 | −1 | 0 | 0 | 0 | 1 | 0 | 0 | 0 | −1 | 0 | 0 | 0 |
|---|---|---|---|----|---|---|---|---|---|---|---|----|---|---|---|
| 0 | −1 | 0 | 0 | 0 | 1 | 0 | 0 | 0 | −1 | 0 | 0 | 0 | 1 | 0 | 0 |
| 0 | 0 | 1 | 0 | 0 | 0 | −1 | 0 | 0 | 0 | 1 | 0 | 0 | 0 | −1 | 0 |
| 0 | 0 | 0 | −1 | 0 | 0 | 0 | 1 | 0 | 0 | 0 | −1 | 0 | 0 | 0 | 1 | randomness of the sampling process can be increased by employing temporal variation of the sampling pattern.

Temporal variation of standard 2D random sampling matrices can be realized by generating a new random matrix for each new frame in a group of frames at 64 in the method 60.

Furthermore, in our case, any temporal variation of the two dimensional compressive sensing sampling matrix are low-cost matrices as described above.

In the present embodiment, this temporal varying sampling at 64 of method 60 (FIG. 11) is achieved by cyclic shifting the low cost compressive sensing sampling matrix, as also illustrated in FIG. 4. In order to increase the randomness of the sampling process, this cyclic shift of the compressive sensing sampling matrix can be done by shifting the values of the matrix according to random integer values. These random integer values can be selected from random permutations. Furthermore, cyclic shift can be applied in one direction i.e. either horizontal or vertical direction or in both directions i.e. both horizontal as well as vertical directions. In this way, novel compressive sensing sampling matrices can be generated for each new frame and these new temporal varying sampling matrices also fulfil the low cost limitations.

In the example of FIG. 4, the random integer number is three and the cyclic shift is in a horizontal direction, i.e. the last three columns of the end of the upper compressive sensing sampling matrix are shifted to the beginning resulting in the lower compressive sensing sampling matrix.

1.4 Non-Uniform Temporal Varying Sampling PMM Encoder Design

To realize a non-uniform PMM (pixel multiplex method) encoding, in the present embodiment compressive sensing sampling matrices are generated with at least two different compression ratios. These sampling matrices also of low cost, i.e. they consist of only ±1, and 0 values and has one nonzero entry per column for generating compressive sensing samples. These different compression ratio sampling matrices may be generated using the method described above herein (e. g. SBHE).

At 66, the method 60 outputs the video data encoded according to 61 to 65. As is apparent from the description above, the non-uniform CS sampling (at 63), the temporal varying CS sampling (at 64) can be pre-performed before the non uniform temporal varying CS sampling at 65. Moreover, the non uniform CS sampling 63, the temporal varying CS sampling 64 and the non uniform temporal varying CS sampling 65 can be including in the generation of the CS sampling matrix at 61.

2. Video CS Reconstruction

Figure 10:
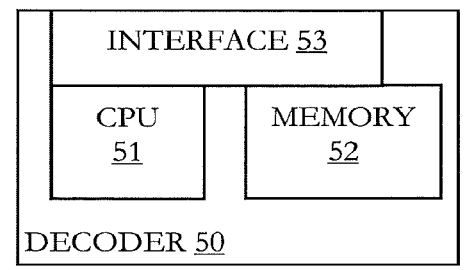
FIG. 10 schematically illustrates a decoder.
Figure 12:
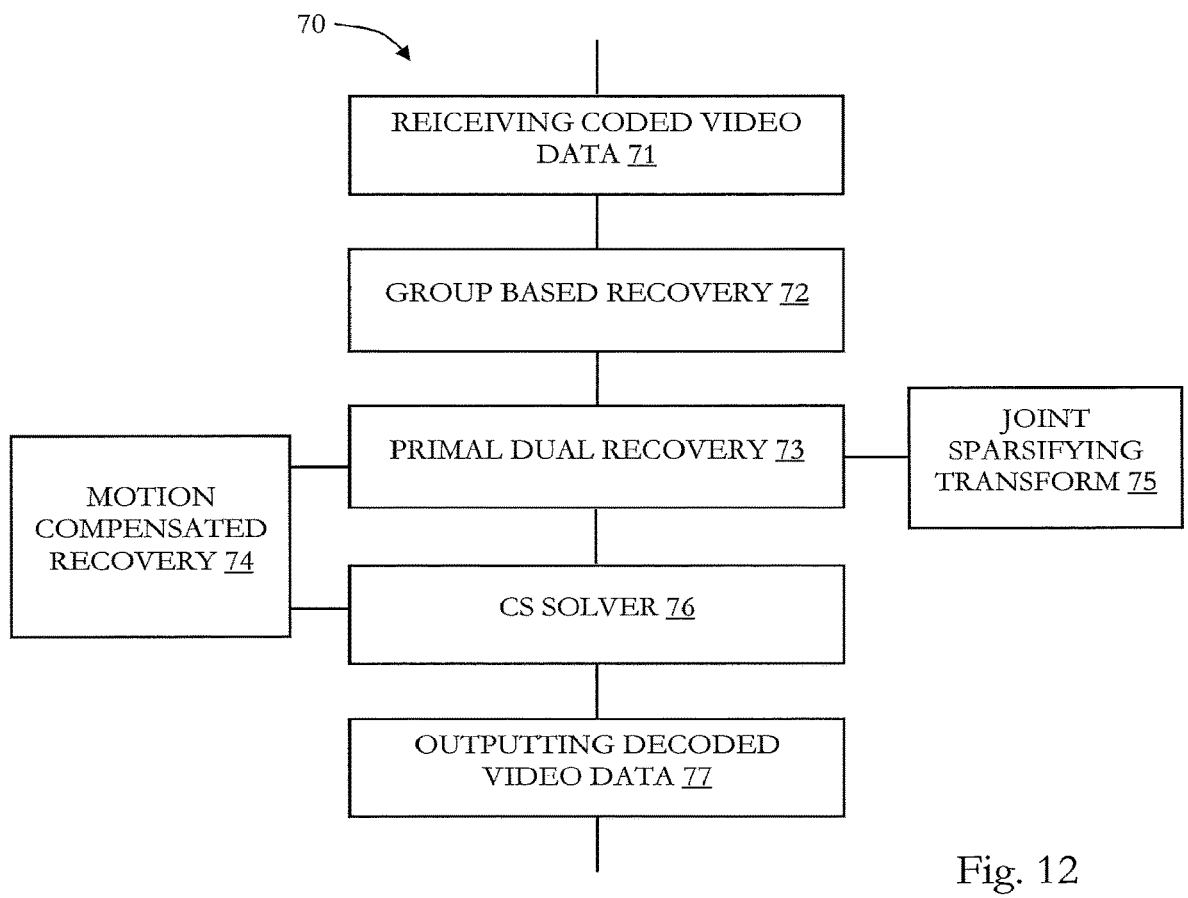
FIG. 12 is a flowchart of a decoding method.

In the following a video decoder and a video decoding method are described under reference to a video decoder 50 of FIG. 10 and a video decoding method 70 as illustrated in FIG. 12.

The video decoder 50 has a CPU 51, a memory 52 and an interface 53. The interface 53 can receive coded video data such as output at 66 of method 60 and by video encoder 40. The video decoder 50 can receive the coded video data at 71 of method 70 in the form of any data format and via a wireless data connection, a hardwired data connection, via storage medium, etc. Moreover the video decoder 50 can be implemented as a personal computer, in a smartphone, a digital camera, etc. The video decoder 50 can be configured to execute the method 70 described in the following.

2.1 Group of Pictures Based Recovery

Figure 5:
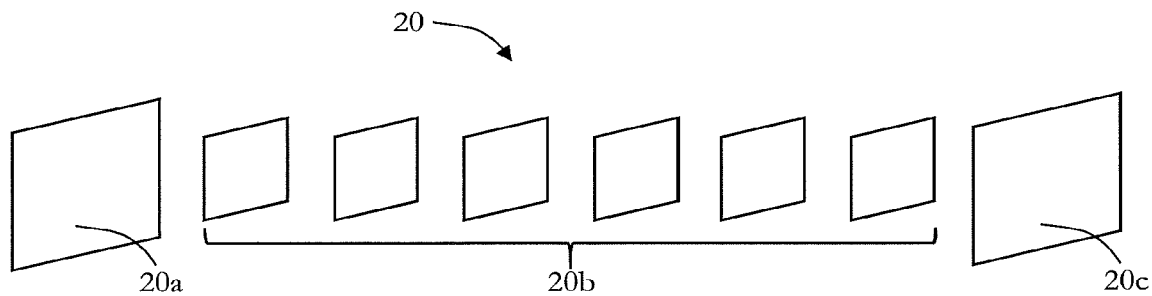
FIG. 5 illustrates a group of video image frames used for decoding.

According to the video decoding method 70, on the basis of the coded video data received at 71 and at 72 a joint recovery is done on one group of several frames 20 (FIG. 5) consisting of N frames 20a, 20b and 20c. The $1^{st}$ frame is sampled as a key-frame 20a, i. e. with a lower CR as discussed above, and the rest N−1 frames 20b are sampled as non-key frames 20b, i. e. with a higher CR.

For making use of a forward and backward motion compensated recovery, in this embodiment, a N+1 group of frames is jointly recovered, where the N+1 frame is a key-frame 20c of a next group of pictures.

However, this (N+1) frame 20c is used as last frame for the recovery of the first group 20 of frames as well as a first frame for the joint recovery of a second group of frames following the first group. This process is repeated for a joint recovery of the rest of the group of frames.

2.2 Primal-Dual CS Recovery Algorithm

Figure 6:
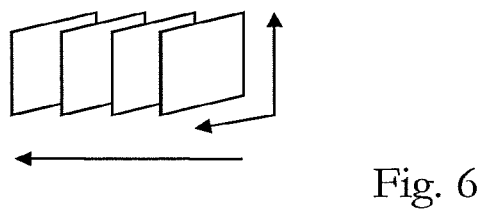
FIG. 6 illustrates space and time coordinates of frames.

Primal-Dual algorithm performed at 73 is based on two terms or steps. The first step is known as primal step that promotes sparsity in the spatial domain such as by making use of a discrete wavelet transform as sparsifying transform. As shown in FIG. 6, the spatial domain is in the plane of a frame, while the time domain means the series of frames (horizontal arrow in FIG. 6). The second step is called dual step that promotes sparsity in the temporal domain by making use of a total variation on inter frame difference.

It can be written in terms of equation as:

$$\text{minimize } \Sigma_i \|\phi_i x_i - y_i\|_2^2 + \tau \|\psi^T x_i\|_1 + \lambda \|\psi^T (x_{i-1} - x_i)\|_1 \quad (1)$$

where $\tau > 0$, and $\lambda > 0$ are the regularization parameters, $\psi$ is sparsifying transform which means that the signal to be recovered has sparse representation in this transform domain.

The first term in the above equation or the $l_2$ term is the data fidelity term and it makes sure that the solution remains close to the actual compressive sensing measurement samples (i. e. $y_i$). The second term in the above equation is $l_1$ regularization term that promotes sparsity in the spatial domain using $\psi$ as sparsifying transform. This term corresponds to a frame by frame or spatial only recovery that does not take advantage of temporal sparseness. Similarly, the third term in the above equation (1) is also $l_1$ regularization term that promotes sparsity in the temporal domain or in inter-frame difference also using $\psi$ as sparsifying transform. In other words, this term promotes sparsity in the inter frame difference in the video signal. However, it should be noted that inter-frame differences do not provide adequate representations of the temporal variations in video sequences mainly due to object and camera motions. Therefore, the motion compensated inter-frame difference capture much better the temporal variation in a video sequence in some embodiments.

Alternatives to the primal dual algorithm are the known interior point method, orthogonal matching pursuit, iterative shrinkage and thresholding, pivoting methods, etc.

2.3 Bi-Direction Motion Compensated Recovery

Figure 7:
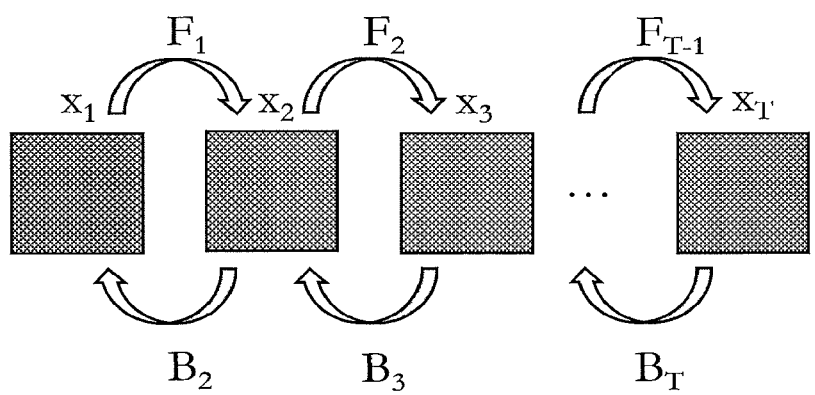
FIG. 7 illustrates motion compensated recovery.

At 74, a bi-direction motion compensated recovery is performed, which is based on both forward and backward or bi-directional motion estimation as well as motion compensation, as also illustrated in FIG. 7.

This process is done iteratively to improve the reconstruction performance in this embodiment. Forward and backward motion estimation is done on the reconstructed frames to obtain a bidirectional motion vector field. Based on these motion vectors, motion compensation is applied in both directions. This bi-directional motion compensated recovery process can be written in terms of the following equation (2):

$$\text{minimize } \Sigma_i \|\phi_i x_i - y_i\|_2^2 + \tau \|\psi^T x_i\|_1 + \alpha \|\psi^T (F_{i-1} x_{i-1} - x_i)\|_1 + \beta \|\psi^T (\beta_{i+1} x_{i+1} - x_i)\|_1$$

Where $F_{i-1}$ represents a forward motion compensation operator and $B_{i+1}$ is the backward motion compensation operator, and τ, α, and β are regularization parameters.

The above system of equation (2) is the motion compensated equivalent of the primal-dual algorithm that promotes sparsity in the spatial as well as temporal domain.

Motion estimation is done on intermediate recovered frames and therefore, in general, any motion estimation method can be used, which is robust to noise and other reconstruction artifacts. Examples of such motion estimation methods are complex wavelet transform based motion estimator or optical flow method, which are known in the art.

In the present embodiment, the complex wavelet based motion estimator is used, because of its robustness to noise and other artifacts.

Motion is actually estimated by utilizing the phases of the complex dual-free wavelets sub-band coefficients, by further employing the hierarchical method as described in J. Magarey et al., "Motion Estimation Using a Complex-Valued Wavelet Transform", IEEE Transactions on Signal Processing, vol. 46, no. 4, pp. 1069-1084, 1998. It has a better performance compared to optical flow methods in some cases.

2.4 Joint or Concatenated Sparsifying Transform

In the present embodiment, a block-based discrete cosine transform (or $\psi_{BlockDCT}$) as well as discrete wavelet transform (or $\psi_{Wavelet}$) as joint or concatenated sparsifying transform are used at 75. This can be denoted by the following equation:

$$\psi = \psi_{BlockDCT} \psi_{Wavelet}$$

This joint sparsifying transform (or ψ) is used in the regularized solution of equations (1) and (2) described above.

Figure 8:
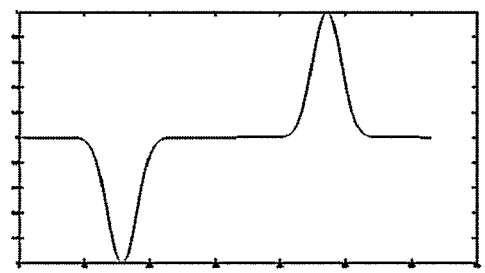
FIG. 8 shows the application of discrete cosine transform and discrete wavelet transform.
Figure 8:
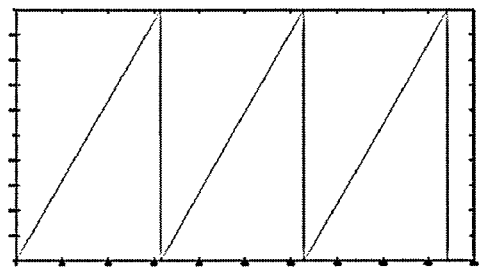
Figure 8:
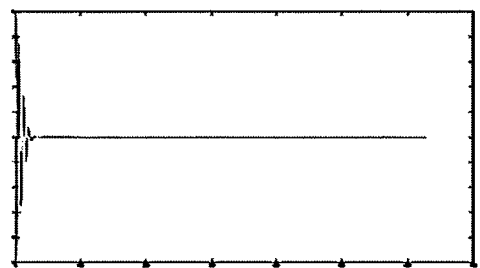
Figure 8:
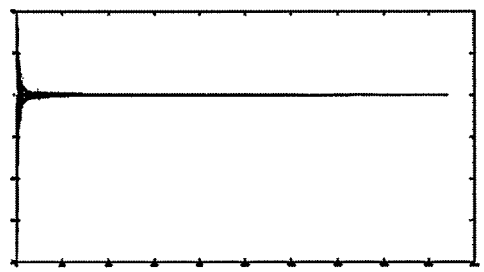
Figure 8:
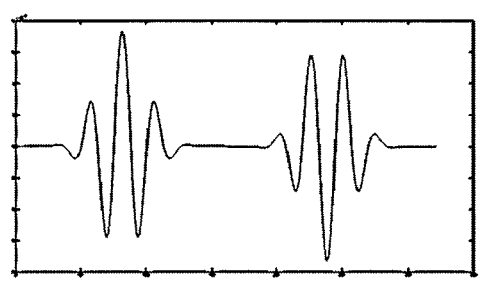
Figure 8:
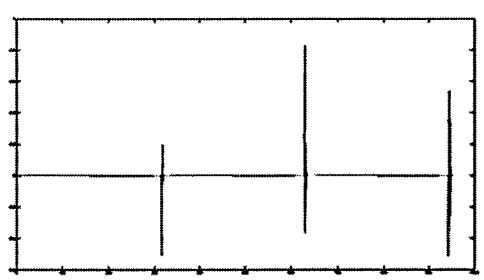

As illustrated in FIG. 8, the discrete cosine transform and the discrete wavelet transform have different characteristics and the combination of both may improve the reconstruction quality.

In FIG. 8a, an exemplary sine powered curve is shown, and FIG. 8b shows the result of the discrete cosine transform applied to it and FIG. 8c shows the result of the discrete wavelet transform applied to it. The discrete cosine transform provides a sparse curve (FIG. 8b), while the discrete wavelet transform does not (FIG. 8c).

In FIG. 8d a saw tooth curve is illustrated and FIG. 8e shows the result of the discrete cosine transform applied to it and FIG. 8f shows the result of the discrete wavelet transform applied to it. As can be taken from FIG. 8f, the discrete wavelet transform results in a sparse curve, while the discrete cosine transform does not (FIG. 8e).

2.5 CS Solver

In the present embodiment, the well-known NESTA (see exemplary S. Becker et al., "NESTA: A fast and accurate first order method for sparse recovery", SIAM J Imaging Sciences, vol. 4, nl. 1, 2011) toolbox is used at 76 (FIG. 12) as compressive sensing solver to solve the optimization problem in equations (1) and (2) and by employing the known l1-analysis formulation. Alternatively, other compressive sensing solvers are Fast Iterative Soft-Thresholding Algorithm (FISTA), Gradient Projections for Sparse Reconstruction (GPSR), Fixed Point continuation (FPC), etc.

Furthermore, as the above describe encoding method 60 is a block-by-block sampling scheme the application of a direct inverse (also known as projection) of the sampling operator will result in blocking artifacts. In order to avoid such blocking artifacts, in this embodiment use of a single iteration of smoothed projected-Landweber (SPL) (see exemplary S. Mun et al., "Block compressed Sensing of Images Using Directional Transforms", in Proceedings of the International Conference on Image Processing, November 2009) algorithm inside each of the NESTA iterations is made. This kind of reconstruction is a variant of the known projected Landweber (PL) reconstruction that is also known as iterative hard thresholding (IHT). It makes use of a Wiener filtering based smoothing operation for the purpose of reducing blocking artifacts in the recovery process. In brief, this lowpass filtering operation introduces smoothness to the PL algorithm without limiting the present disclosure in this regard.

As can also be taken from FIG. 12 and as is mentioned above, the motion compensated recovery at 74 can be performed iteratively and/or interacting with the primal dual recovery at 73 and/or with the CS solver at 76. Moreover, the joint sparsifying transform at 75 can be performed iteratively and/or interacting with the primal dual recovery at 73.

Some embodiments pertain to a video system including the video encoder 40 and the video decoder 50.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. For example the ordering of 61 to 66 in the embodiment of FIG. 11 may be exchanged. Also, the ordering of 71 to 77 in the embodiment of FIG. 12 may be exchanged. Moreover, parts of the methods 60 and 70 can be omitted and/or exchanged by another method part, e. g. 63, 64 of method 60 and 72, 73, 74 and 76 of method 70.

Please note that the division of the encoder 40 into units 41 to 43 and the division of the decoder 50 into units 51 to 53 is only made for illustration purposes and that the present disclosure is not limited to any specific division of functions in specific units.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

The skilled person will appreciate that the present technology is not limited to the examples mentioned above, but can be applied vastly in other technical fields. For example, the present technology can also be applied to security cameras, cameras used in the automotive field (side view camera, front camera, backside camera etc.), cameras in the medical field (endoscope etc.), or the like.

Note that the present technology can also be configured as described below.

(1) A video coding apparatus for encoding a compressive sensing signal including a processor, the processor being configured to
   obtain a compressive sensing sampling matrix; and
   capture the compressive sensing signal representing image data based on the compressive sensing sampling matrix, wherein the compressive sensing sampling matrix is non-uniform varied.
(2) The video coding apparatus according to (1), wherein the compressive sensing sampling matrix is temporal varied by applying a cyclic shift.
(3) The video coding apparatus according (2), wherein the cyclic shift is based on at least one of: vertical shift and horizontal shift.
(4) The video coding apparatus according to anyone of (1) to (3), wherein obtaining the compressive sensing sampling matrix is based on at least one of Hadamard transform and Gaussian distribution.
(5) The video coding apparatus according to anyone of (1) to (5), wherein the compressive sensing sampling matrix is used on a frame-by-frame basis for capturing the compressive sensing signal.
(6) The video coding apparatus according to (5), wherein for each frame a new compressive sensing sampling matrix is obtained, wherein the compressive sensing sampling matrix is random.
(7) The video coding apparatus according to (5) or (6), wherein at least one of the frames is a key frame being generated with a lower compression ratio compared to at least one other frame.
(8) The video coding apparatus according to anyone of (1) to (7), wherein at least two different compressive sensing sampling matrices are obtained for at least two different compression ratios to be used for capturing the compressive sensing signal.
(9) The video coding apparatus according to anyone of (1) to (8), wherein the compressive sensing sampling matrix fulfils at least one of the following conditions: a mean value of the absolute sum along each column of the sampling matrix is equal to one, and a variance of the absolute sum along each column of the sampling matrix is equal to zero.
(10) The video coding apparatus according to anyone of (1) to (9), wherein the sampling matrix consists of 0, +1 and −1 values.
(11) A video decoding apparatus for decoding compressive sensing video data including a processor, the processor being configured to decode compressive sensing video data on the basis of a sparsifying transform being based on a discrete cosine transform and a discrete wavelet transform.
(12) The video decoding apparatus of (11), wherein the sparsifying transform is based on a product of the discrete cosine transform and the discrete wavelet transform.
(13) The video decoding apparatus of (11) or (12), wherein the compressive sensing video data includes video frames and the processor is further configured to identify video frame groups.
(14) The video decoding apparatus of anyone of (11) to (13), wherein the processor is further configured to perform motion detection on the compressive sensing video data.
(15) The video decoding apparatus of anyone of (11) to (14), wherein the processor is further configured to perform motion estimation on the compressive sensing video data.
(16) A video system including:
   a video coding apparatus for encoding a compressive sensing signal including a processor, the processor being configured to
      obtain a compressive sensing sampling matrix; and
      capture the compressive sensing signal representing image data based on the compressive sensing sampling matrix, wherein the compressive sensing sampling matrix is temporal and nonuniform varied; and
   a video decoding apparatus for decoding compressive sensing video data including a processor, the processor being configured to decode compressive sensing video data on the basis of a sparsifying transform being based on a discrete cosine transform and a discrete wavelet transform.
(17) The video system of (16) and according to anyone of (1) to (15).
(18) A method of encoding a compressive sensing signal, in particular performed by the apparatus of anyone of (1) to (10), including:
   obtaining a compressive sensing sampling matrix; and
   capturing the compressive sensing signal representing image data based on the compressive sensing sampling matrix, wherein the compressive sensing sampling matrix is non-uniform varied.
(19) The method of (18), wherein the compressive sensing sampling matrix is temporal varied by applying a cyclic shift.
(20) The method of (19), wherein the cyclic shift is based on at least one of: vertical shift and horizontal shift.
(21) The method of anyone of (18) to (20), wherein obtaining the compressive sensing sampling matrix is based on at least one of Hadamard transform and Gaussian distribution.
(22) The method of anyone of (18) to (21), wherein the compressive sensing sampling matrix is used on a frame-by-frame basis for capturing the compressive sensing signal.
(23) The method of (22), wherein for each frame a new compressive sensing sampling matrix is obtained, wherein the compressive sensing sampling matrix is random.
(24) The method of (22) or (23), wherein at least one of the frames is a key frame being generated with a lower compression ratio compared to at least one other frame.
(25) The method of anyone of (18) to (24), wherein at least two different compressive sensing sampling matrices are obtained for at least two different compression ratios to be used for capturing the compressive sensing signal.
(26) The method of anyone of (18) to (25), wherein the compressive sensing sampling matrix fulfils at least one of the following conditions: a mean value of the absolute sum along each column of the sampling matrix is equal to one, and a variance of the absolute sum along each column of the sampling matrix is equal to zero.
(27) The method of anyone of (18) to (26), wherein the sampling matrix consists of 0, +1 and −1 values.
(28) A video decoding method for decoding compressive sensing video data, in particular performed by the apparatus of anyone of (11) to (15), including decoding compressive sensing video data on the basis of a sparsifying transform being based on a discrete cosine transform and a discrete wavelet transform.
(29) The video decoding method of (28), wherein the sparsifying transform is based on a product of the discrete cosine transform and the discrete wavelet transform.
(30) The video decoding method of (28) or (29), wherein the compressive sensing video data includes video frames and the method further includes identifying video frame groups.
(31) The video decoding method of anyone of (28) to (30), further including performing motion detection on the compressive sensing video data.

(32) The video decoding method of anyone of (28) to (31), further including performing motion estimation on the compressive sensing video data.

(33) A computer program including program code causing a computer to perform the method according to anyone of (18) to (27) and/or to perform the method according to anyone of (28) to (32), when being carried out on a computer.

(34) A non-transitory computer-readable recording medium that stores therein a computer program product, which, when executed by a processor, causes the method according to anyone of (18) to (27) to be performed and/or the method according to anyone of (28) to (32) to be performed.

The invention claimed is:

1. A video coding apparatus for encoding a compressive sensing signal comprising a processor configured to
    obtain at least two compressive sensing sampling matrices;
    capture the compressive sensing signal representing image data based on the at least two compressive sensing sampling matrices,
    wherein the processor is configured to capture the compressive sensing signal using the at least two different compressive sensing sampling matrices obtained for at least two different compression ratios, and
    wherein the at least two different compressive sensing sampling matrices are temporally varied.

2. The video coding apparatus according to claim 1, wherein the at least two compressive sensing sampling matrices are temporally varied by applying a cyclic shift.

3. The video coding apparatus according to claim 2, wherein the cyclic shift is based on at least one of: vertical shift and horizontal shift.

4. The video coding apparatus according to claim 1, wherein the processor is configured to obtain the at least two compressive sensing sampling matrices based on at least one of Hadamard transform and Gaussian distribution.

5. The video coding apparatus according claim 1, wherein the processor is configured to capture the compressive sensing signal using the at least two compressive sensing sampling matrices on a frame-by-frame basis.

6. The video coding apparatus according to claim 5, wherein the processor is configured to capture the compressive sensing signal using a new compressive sensing sampling matrix for each frame, wherein the at least two compressive sensing sampling matrices are random.

7. The video coding apparatus according to claim 5, wherein at least one of the frames is a key frame being generated with a lower compression ratio compared to at least one other frame.

8. The video coding apparatus according to claim 1, wherein the at least two compressive sensing sampling matrices fulfil at least one of the following conditions: a mean value of the absolute sum along each column of the sampling matrix is equal to one, and a variance of the absolute sum along each column of the sampling matrix is equal to zero.

9. The video coding apparatus according to claim 1, wherein the at least two compressive sensing sampling matrices consist of 0, +1 and −1 values.

10. A method of encoding a compressive sensing signal comprising:
    obtaining at least two compressive sensing sampling matrices; and
    capturing the compressive sensing signal representing image data based on the at least two compressive sensing sampling matrices,
    wherein the at least two different compressive sensing, sampling matrices have at least two different compression ratios, and
    wherein the at least two different compressive sensing sapling matrices are temporally varied.

11. The method according to claim 10, wherein the at least two compressive sensing sampling matrices are temporally varied by applying a cyclic shift.

* * * * *